United States Patent
Abe et al.

(10) Patent No.: US 7,801,450 B2
(45) Date of Patent: Sep. 21, 2010

(54) OPTICAL TRANSMITTER AND OPTICAL COMMUNICATION SYSTEM

(75) Inventors: Jun'ichi Abe, Tokyo (JP); Katsuhiro Shimizu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 635 days.

(21) Appl. No.: 11/663,743

(22) PCT Filed: Nov. 8, 2004

(86) PCT No.: PCT/JP2004/016535

§ 371 (c)(1),
(2), (4) Date: Mar. 26, 2007

(87) PCT Pub. No.: WO2006/048944

PCT Pub. Date: May 11, 2006

(65) Prior Publication Data

US 2008/0107428 A1 May 8, 2008

(51) Int. Cl.
 *H04B 10/04* (2006.01)
(52) U.S. Cl. .................. 398/193; 398/198
(58) Field of Classification Search ........... 398/193, 398/198
See application file for complete search history.

(56) References Cited

U.S. PATENT DOCUMENTS

| | | | |
|---|---|---|---|
| 5,742,268 A | 4/1998 | Noda et al. | |
| 5,900,621 A | 5/1999 | Nagakubo et al. | |
| 6,757,499 B1 | 6/2004 | Aoki | |
| 6,856,441 B2* | 2/2005 | Zhang et al. | 359/245 |
| 7,164,865 B2* | 1/2007 | Tatsuno et al. | 398/201 |
| 7,174,104 B2* | 2/2007 | Shin et al. | 398/91 |
| 7,308,210 B2* | 12/2007 | Khayim et al. | 398/198 |
| 7,359,645 B2* | 4/2008 | Miyashita et al. | 398/147 |
| 7,574,142 B2* | 8/2009 | Stewart | 398/154 |
| 2002/0051270 A1 | 5/2002 | Tatsuno et al. | |
| 2004/0028099 A1 | 2/2004 | Hongo et al. | |
| 2004/0090659 A1 | 5/2004 | Zhang et al. | |
| 2006/0062514 A1* | 3/2006 | Agranat | 385/17 |

FOREIGN PATENT DOCUMENTS

| | | |
|---|---|---|
| JP | 4-294318 A | 10/1992 |
| JP | 8-136871 A | 5/1996 |
| JP | 2000-36794 A | 2/2000 |
| JP | 2000-206474 A | 7/2000 |
| JP | 2001-189699 A | 7/2001 |
| JP | 2001-284711 A | 10/2001 |
| JP | 2001-350128 A | 12/2001 |
| JP | 2004-61556 A | 2/2004 |

* cited by examiner

*Primary Examiner*—Quan-Zhen Wang
(74) *Attorney, Agent, or Firm*—Birch, Stewart, Kolasch & Birch, LLP.

(57) ABSTRACT

An optical transmitter includes an optical modulator, an optical coupler, a crosspoint monitoring unit, a reference-value setting unit, and a bias circuit. The optical coupler splits an optical signal output from the optical modulator into a plurality of optical signals. The crosspoint monitoring unit receives part of the optical signals, and monitors a crosspoint of the optical signal output from the optical modulator. The reference-value setting unit sets a bias reference value to be assigned to the optical modulator based on an output of the crosspoint monitoring unit so that the crosspoint is constant. The bias circuit applies a bias to the optical modulator based on the bias reference value.

4 Claims, 16 Drawing Sheets

OPTICAL TRANSMITTER AND OPTICAL COMMUNICATION SYSTEM

TECHNICAL FIELD

The present invention relates to an optical transmitter and an optical communication system, and more particularly, to a wavelength-independent optical transmitter, and a wavelength-independent optical communication system that includes the optical transmitter.

BACKGROUND ART

In an optical transmitter using a conventional external modulator, generally, an optical signal of a single wavelength enters the modulator. Therefore, the optical transmitter has no function of processing an optical signal of plural wavelengths. In other words, there is no request for making the transmitter independent of a wavelength. However, in recent years, there has been a request for realization of a wavelength-independent optical transmitter, in relation to a request for cost reduction and improvement of flexibility of the optical communication system.

An optical transmitter using an electro absorption (EA) modulator can be easily integrated with other optical elements such as a light source and a semiconductor optical amplifier (SOA), and has an advantage in that the own driving voltage can be 2 to 3 volts as a sufficient value. On the other hand, this EA modulator has a disadvantage in that wavelength dependency is large, and requires a characteristic that the EA modulator is not dependent on the wavelength of an incident wave, that is, a control method of the EA modulator having wavelength independency.

For example, as a bias control method of an EA modulator, there is disclosed a control method of inputting an output of an LD light source controlled at a constant level to the EA modulator, taking out part of this output to obtain a modulation monitor light, and setting a ratio of this modulation monitor light to the back monitor light of the LD light source to a constant level (set an extinction ratio to a constant level) (for example, Patent Document 1).

On the other hand, to overcome degradation of an electric waveform generated due to the degradation of an FET inside the IC, there is also disclosed a method of adjusting a crosspoint of an electronic waveform by controlling the extinction ratio of the EA modulator output light to a constant level (for example, Patent Document 2).

Patent Document 1: Japanese Patent Application Laid-open No. 2000-36794
Patent Document 2: Japanese Patent Application Laid-open No. 2001-189699

DISCLOSURE OF INVENTION

Problem to be Solved by the Invention

However, according to the control method of making the extinction ratio constant as shown in the Patent Document 1 and the Patent Document 2, the EA modulator having a large wavelength dependency in the extinction characteristic and the insertion loss of the background (in general, a loss is said to be larger when a wavelength becomes shorter) has difficulty in achieving a wavelength independency.

There is also a problem that an optimum control of an extinction ratio is difficult in the application where the light source is not fixed, a wavelength input to the EA modulator changes, and an input level varies.

The present invention has been achieved in view of the above problems, and has an object of disclosing a wavelength independent technique and providing an wavelength-independent optical transmitter and an wavelength-independent optical communication system based on the wavelength independent technique.

Means for Solving Problem

To overcome the above problems and achieve the object mentioned above, according to the present invention, an optical transmitter includes an optical modulator, an optical coupler that splits an optical signal output from the optical modulator into a plurality of optical signals, a crosspoint monitoring unit that receives part of the optical signals obtained by the optical coupler and monitors a crosspoint of the optical signal output from the optical modulator, a reference-value setting unit that sets a bias reference value to be assigned to the optical modulator based on an output signal of the crosspoint monitoring unit so that the crosspoint is constant, and a bias circuit that applies a predetermined bias to the optical modulator based on the bias reference value output from the reference-value setting unit.

Effect of the Invention

According to an optical transmitter of the present invention, a simple operation of bias control can realize a wavelength-independent optical transmitter.

According to an optical communication system of the present invention, a simple operation of bias control can realize a wavelength-independent optical communication system.

EXPLANATIONS OF LETTERS OR NUMERALS

Figure 1:
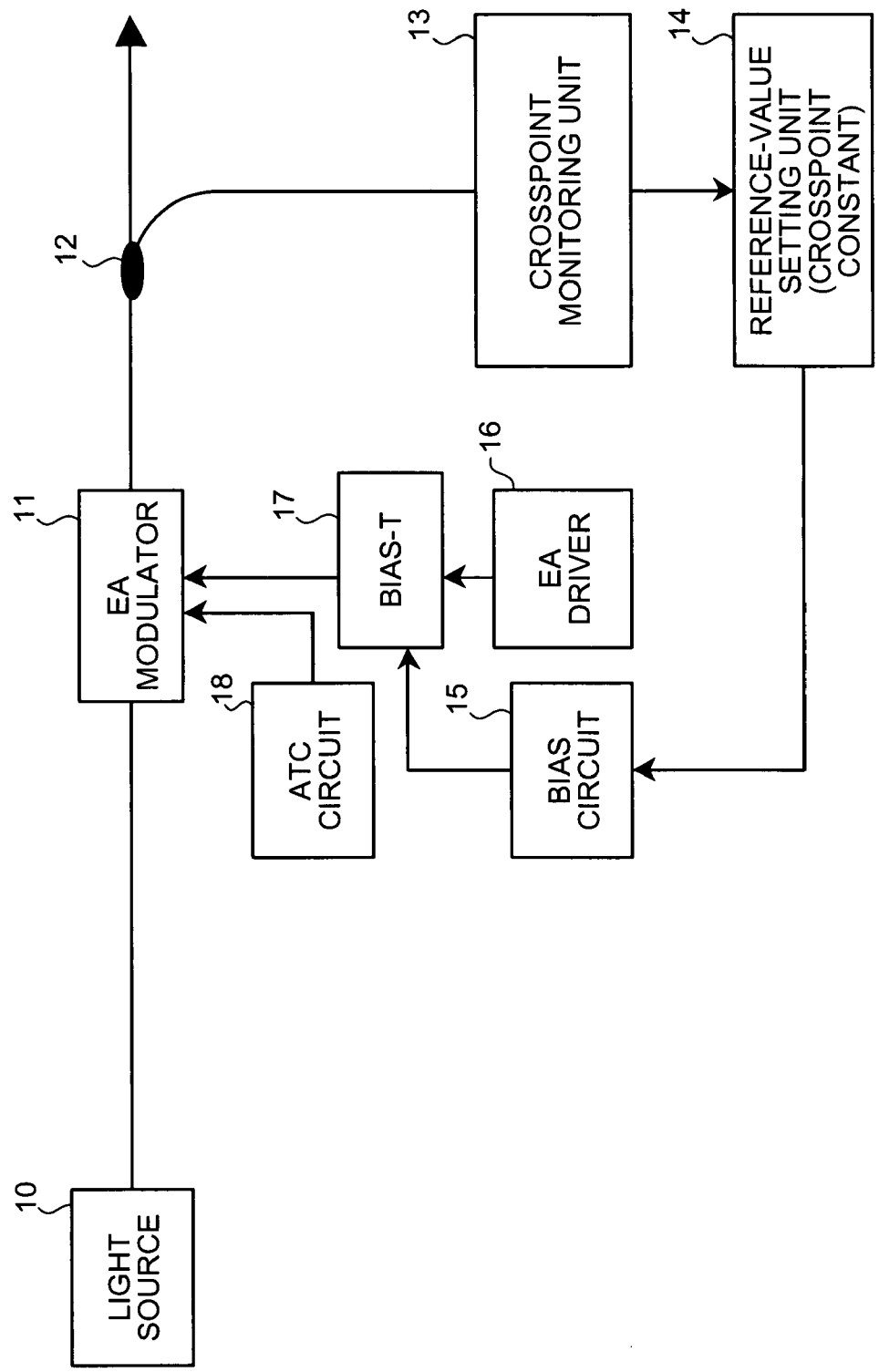
FIG. 1 is a block diagram of a configuration of an optical transmitter according to a first embodiment of the present invention.

10 Light source
11 Modulator
12 Optical coupler
13 Crosspoint monitoring unit
14 Reference-value setting unit
15 Bias circuit
16 EA driver
17 Bias-T
18 ATC circuit
60 Optical coupler
61 Peak detector
62, 93 Optical detector
70 Wavelength monitoring unit
71 Reference-value setting unit
90 Optical coupler
91 Optical amplifier
92 AGC circuit
94 Excitation-current monitoring unit
95 Wavelength determining unit
120 Wavelength-variable light source
121 Optical modulator
122 Wavelength-independent modulator controller
123 Modulator driver
125 Wavelength-independent optical transmitter
130 Wavelength-multiplexing light source
131 Wavelength demultiplexer
140 Wavelength managing unit

BEST MODE(S) FOR CARRYING OUT THE INVENTION

Exemplary embodiments of an optical transmitter and an optical communication system according to the present invention are explained below in detail with reference to the accompanying drawings. Note that the present invention is not limited to the embodiments.

(Salient Features of the Present Invention)

As a result of experiments and various observations, the present inventors have found that, in an optical transmitter using a predetermined light source, a crosspoint of output signal waveforms observed at the time of obtaining a maximum extinction ratio is constant regardless of a waveform. The optical transmitter according to the present invention is configured based on this knowledge. More specifically, a crosspoint is controlled to be held constant, based on an output signal of a crosspoint monitoring unit that monitors the crosspoint of output signal waveforms output from the optical transmitter. As a result of this control, a wavelength-independent optical transmitter and a wavelength-independent optical communication system can be realized with a simple configuration without creating a complex lookup table or data.

First Embodiment

An optical transmitter according to a first embodiment of the present invention is explained below with reference to FIGS. 1 to 7. FIG. 1 is a block diagram of a configuration of the optical transmitter according to the first embodiment of the present invention. In FIG. 1, the optical transmitter according to this embodiment includes: a light source 10; an EA modulator 11 to which an output light of the light source 10 is input; an optical coupler 12 that splits an optical signal output from the EA modulator 11; a crosspoint monitoring unit 13 that monitor a position of a crosspoint based on part of split optical signals obtained by the optical coupler 12; a reference-value setting unit 14 that sets a predetermined reference value so that a crosspoint becomes constant based on an output signal of the crosspoint monitoring unit 13; a bias circuit 15 that applies a predetermined bias, based on a set value set by the reference-value setting unit 14; an EA driver 16 that drives the EA modulator 11; a bias-T 17 that gives a direct-current bias output from the bias circuit 15, to an RF signal from the EA driver 16; and an ATC circuit 18 that controls the EA modulator 11 to a predetermined set temperature.

Figure 2:
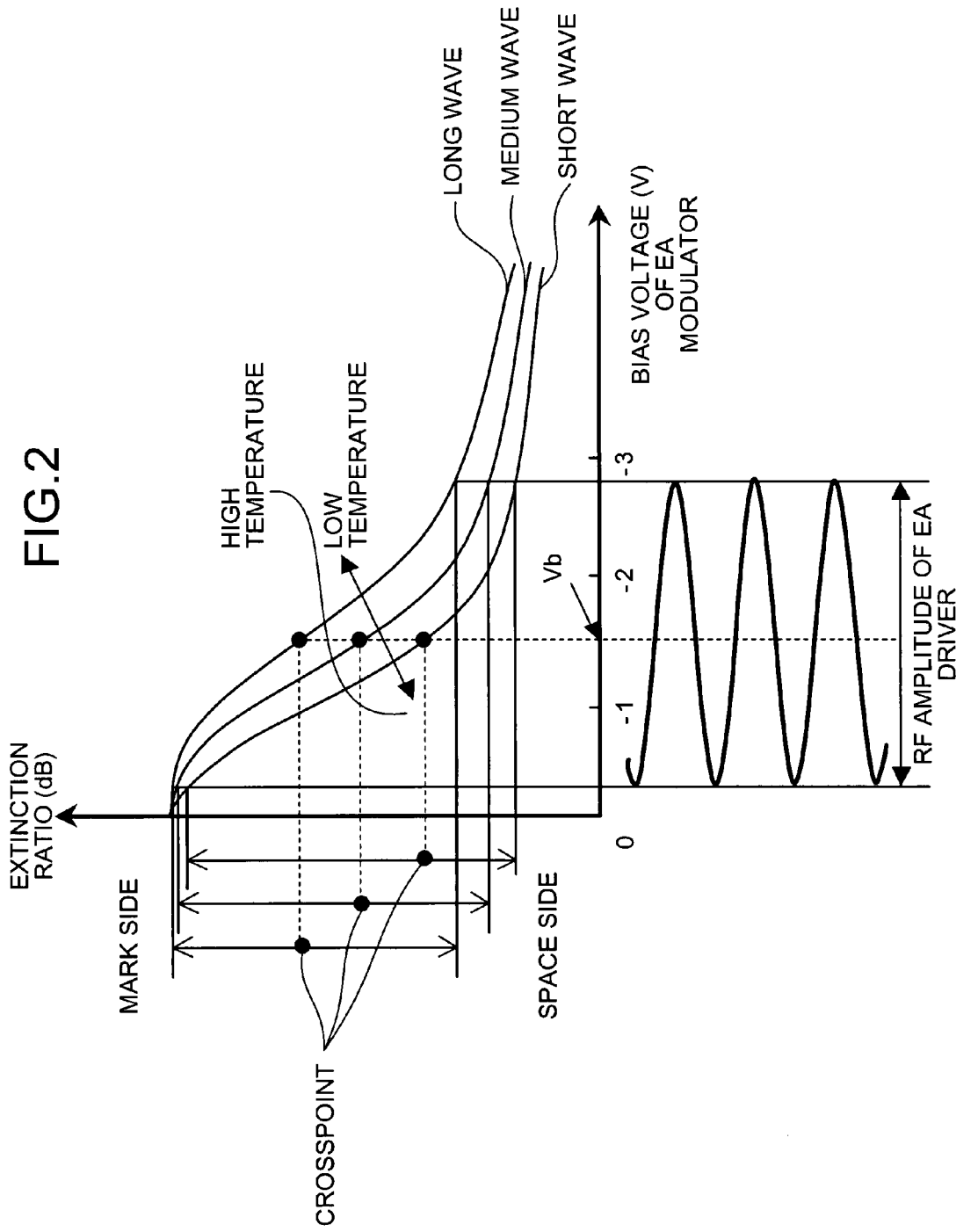
FIG. 2 is a chart of characteristics of a general EA modulator.

Characteristics of a general EA modulator are explained next. FIG. 2 is a chart of characteristics of a general EA modulator. More specifically, FIG. 2 is a chart that depicts a relationship between a bias voltage Vb of a direct-current bias voltage and an extinction ratio (DC extinction ratio) with respect to different wavelengths (long wave, medium wave, and short wave).

General characteristics of the EA modulator are known to have the wavelength dependency as shown in FIG. 2, based on the Franz-Keldysh effect according to the application of an electric field to a bulk semiconductor. As is clear from the waveform shown in FIG. 2, when the modulator is driven by keeping a bias voltage Vb of the EA modulator constant, the crosspoint moves downward when the wavelength becomes shorter, and on the other hand, the crosspoint moves upward when the wavelength becomes longer.

Figure 3:
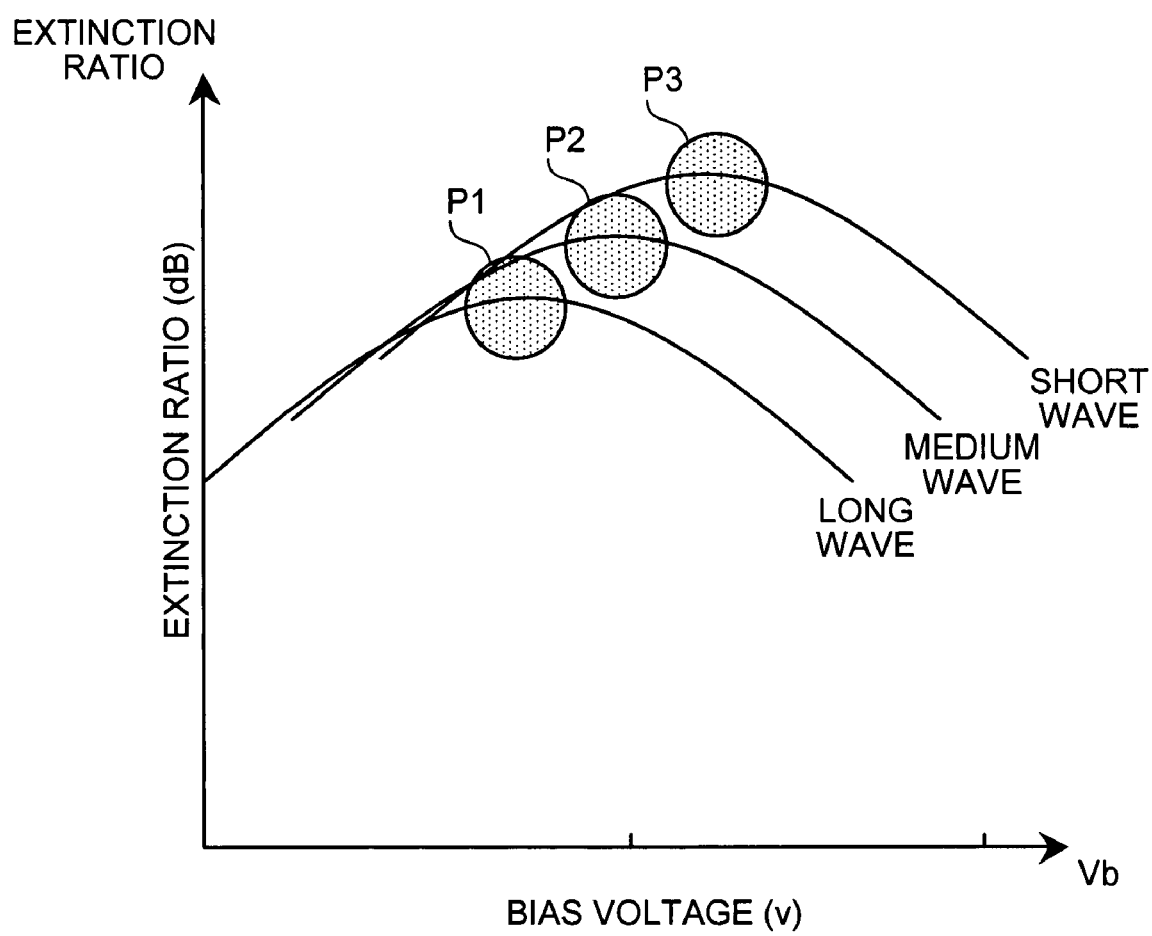
FIG. 3 is a chart that depicts a relationship between bias voltage Vb and an extinction ratio (dynamic extinction ratio) when amplitude (RF amplitude) of a driving signal that drives an EA modulator is constant.

FIG. 3 is a chart that depicts a relationship between the bias voltage Vb and the extinction ratio (dynamic extinction ratio) when the amplitude (RF amplitude) of a driving signal that drives the EA modulator is constant. In FIG. 3, meshed parts P1, P2, and P3 represent areas where the extinction ratio of each wavelength of a long wave, a medium wave, and a short wave becomes maximum. As shown by these areas, the bias voltage Vb at which the extinction ratio becomes maximum is different depending on the wavelength.

According to the conventional control method of the EA modulator, the bias voltage Vb is controlled to make the extinction ratio constant. Therefore, when the wavelength of an optical signal that enters the EA modulator changes, the bias voltage Vb optimum for the wavelength may not be applied. Because the EA modulator itself has a characteristic that the insertion loss of the background changes depending on the wavelength (in general, the loss is large when the wavelength is short), the conventional EA modulator has difficulty in carrying out a wavelength-independent control, because of this characteristic.

Figure 4:
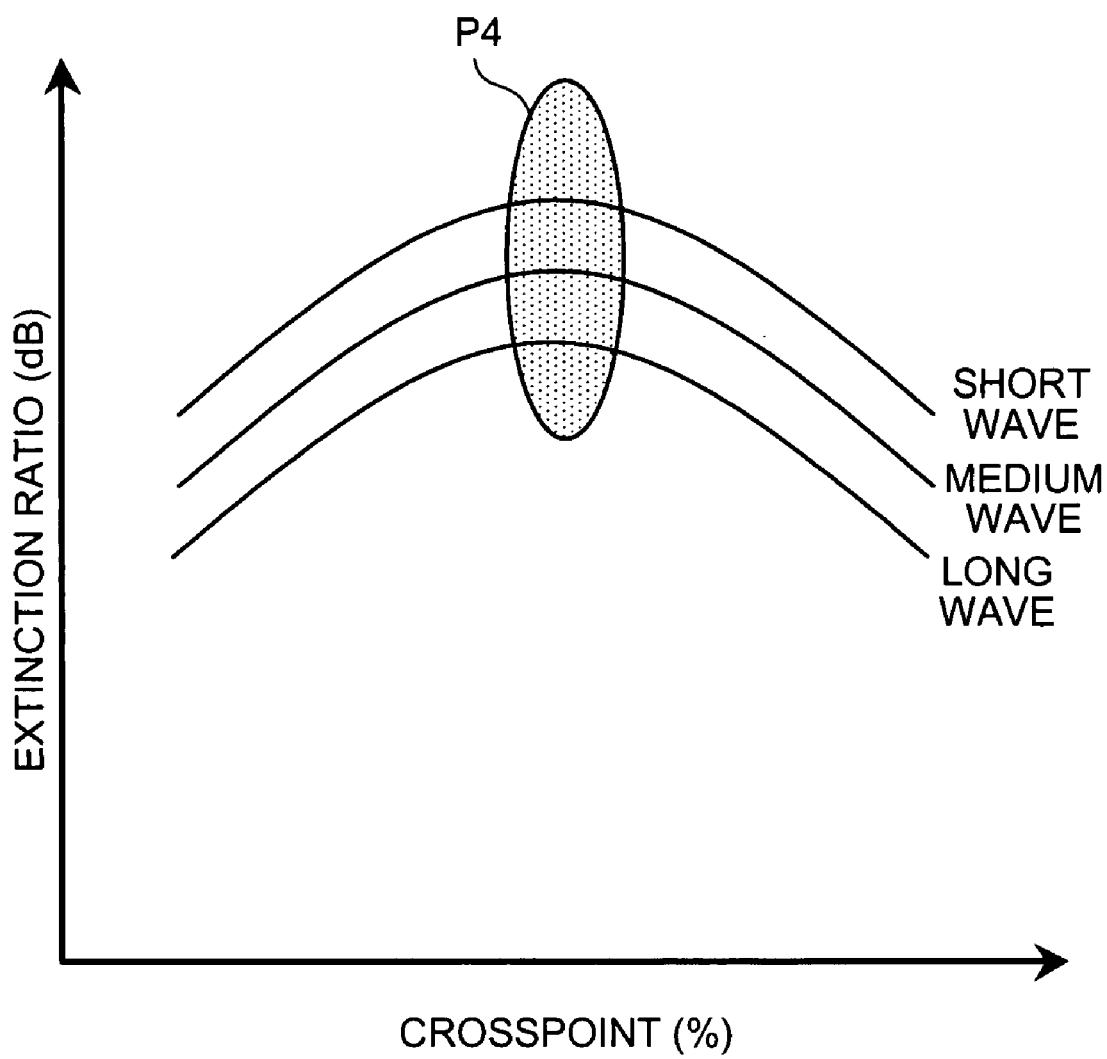
FIG. 4 is a chart that depicts a relationship between a crosspoint and a dynamic extinction ratio when amplitude of a driving signal that drives the EA modulator is constant.

FIG. 4 is a chart that depicts a relationship between the crosspoint and the dynamic extinction ratio when the amplitude of the driving signal that drives the EA modulator is constant. As shown in FIG. 4, the crosspoint in the area of the meshed part P4 where the extinction ratio is optimum does not depend on the wavelength. Therefore, by controlling (feedback controlling) the crosspoint to be set constant, it becomes possible to provide a wavelength-independent optical transmitter that does not depend on the wavelength of the optical signal which is input to the EA modulator.

Figure 5:
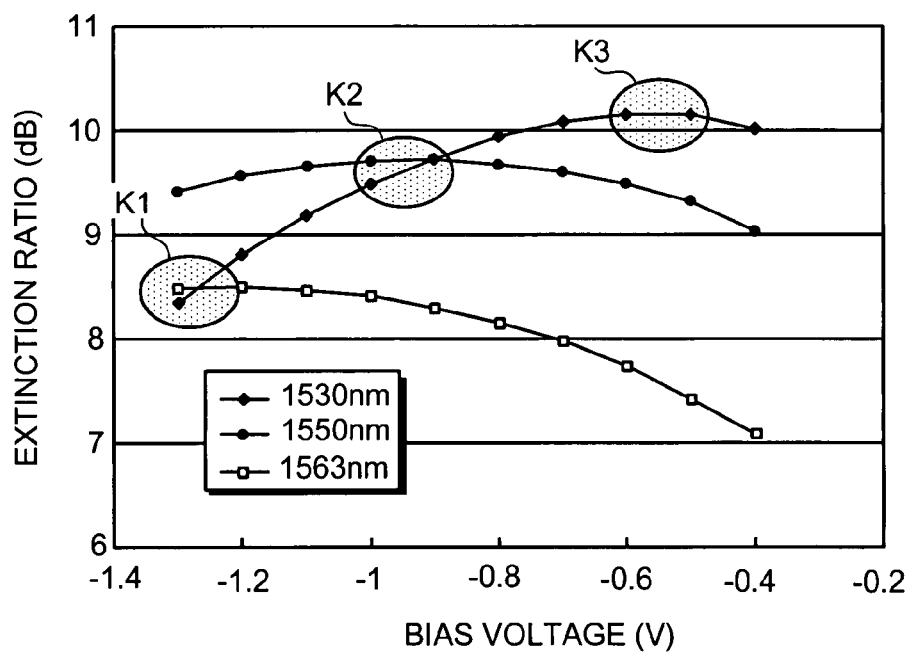
FIG. 5 is an example of measurement results corresponding to FIG. 3.
Figure 6:
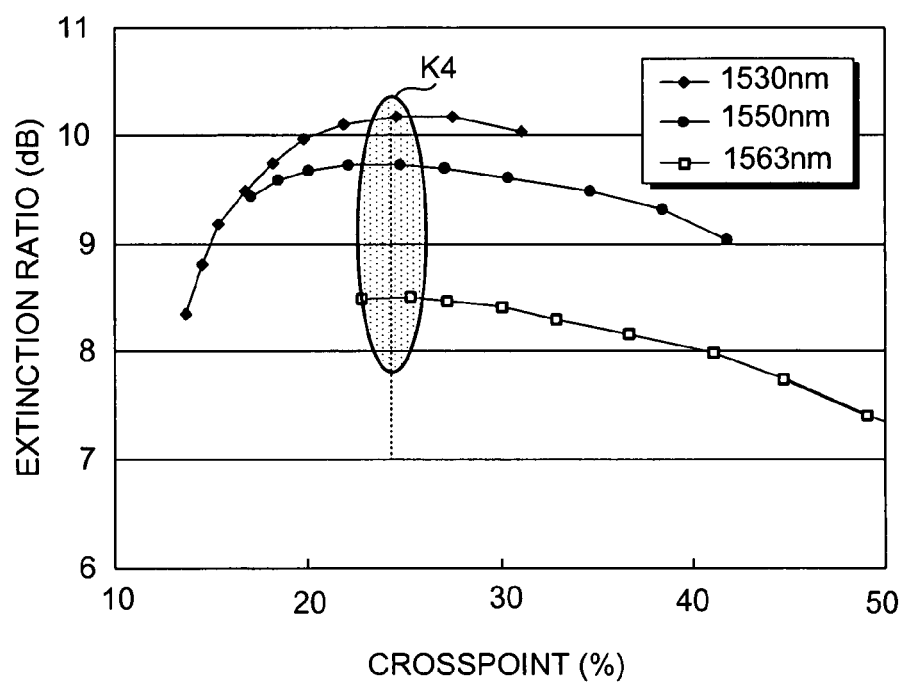
FIG. 6 is an example of measurement results corresponding to FIG. 4.

FIGS. 5 and 6 are examples of measurement results corresponding to FIGS. 3 and 4, respectively. In FIG. 5, a waveform denoted by a "black square (♦)" mark indicates a bias voltage-extinction ratio characteristic of the EA modulator when an incident wave of 1530 nanometers enters. Similarly, a waveform denoted by a "black circle (●)" mark indicates a characteristic when an incident wave of 1550 nanometers enters, and a waveform denoted by a "white square (□)" mark indicates a characteristic when an incident wave of 1563 nanometers enters. In FIG. 5, meshed parts K1, K2, K3 correspond to the meshed parts P1, P2, P3 in FIG. 3, and the characteristic shown in FIG. 3, that is, the characteristic that "a bias voltage of which extinction ratio becomes optimum depends on the wavelength" is apparent.

In FIG. 6, a waveform denoted by a "black square (♦)" mark indicates a crosspoint-dynamic extinction ratio characteristic of the EA modulator when an incident wave of 1530 nanometers enters. Similarly, a waveform denoted by a "black circle (●)" mark indicates a characteristic when an incident wave of 1550 nanometers enters, and a waveform denoted by a "white square (□)" mark indicates a characteristic when an incident wave of 1563 nanometers enters. In FIG. 6, a meshed part K4 corresponds to the meshed part P4 in FIG. 4, and the characteristic shown in FIG. 4, that is, the characteristic that "a crosspoint that makes the extinction ratio optimum does not depend on the wavelength" is apparent.

Figure 7:
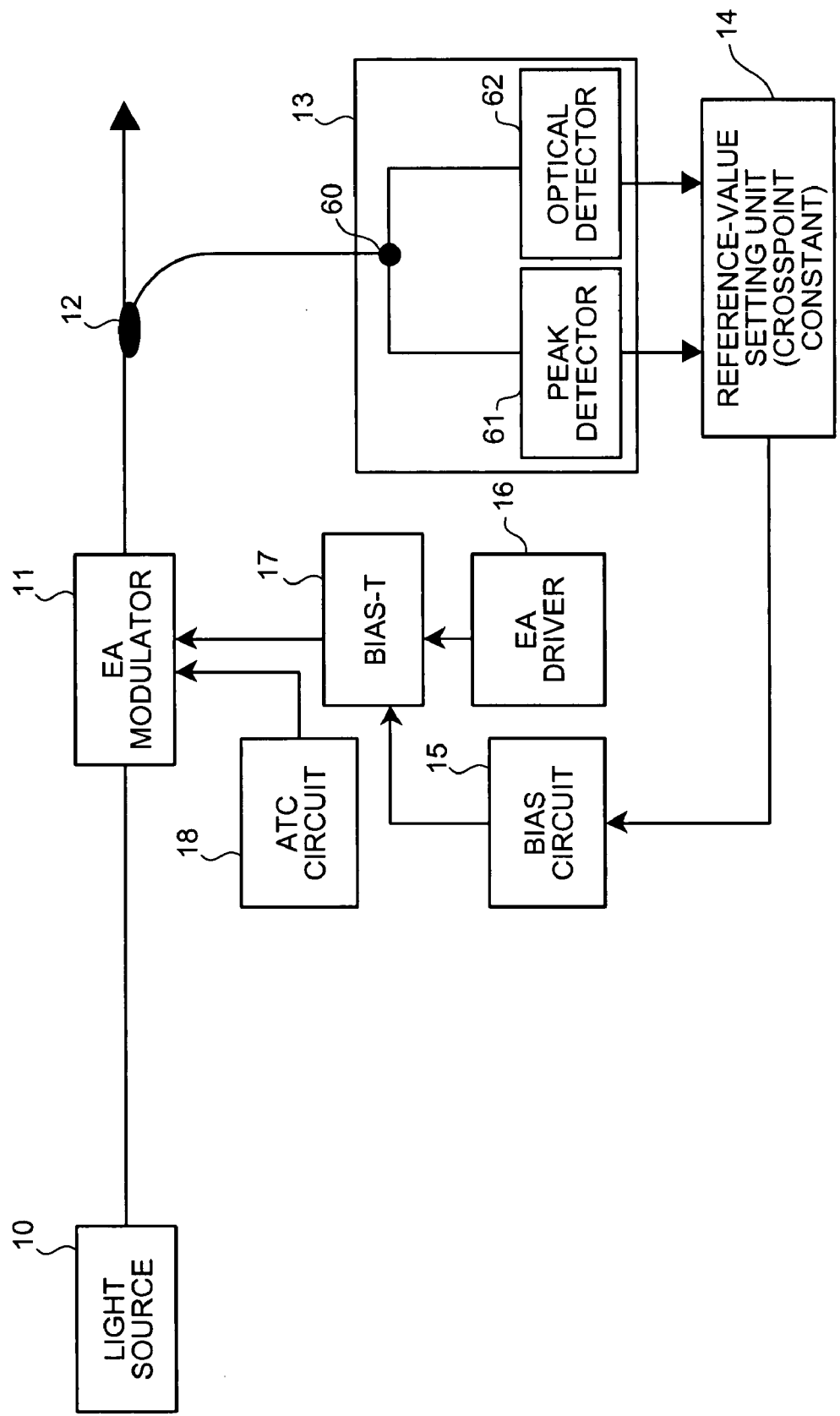
FIG. 7 is one example of a crosspoint monitoring unit of the optical transmitter according to the first embodiment shown in FIG. 1.

FIG. 7 is one example of the crosspoint monitoring unit 13 of the optical transmitter according to this embodiment shown in FIG. 1. As shown in FIG. 7, the crosspoint monitoring unit 13 includes an optical coupler 60, a peak detector 61, and an optical detector 62 made of a photodiode (PD), for example.

In FIG. 7, the optical coupler 60 distributes part of the optical signals obtained as a result of splitting by the optical coupler 12 to the peak detector 61 and the optical detector 62. The peak detector 61 detects peak power of the distributed optical signal. In other words, the peak detector 61 calculates an output proportional to the peak power of the optical signal output. On the other hand, the optical detector 62 detects the power of the distributed optical signal. In other words, the optical detector 62 calculates the output proportional to the average power of the optical signal output.

The position of the crosspoint of the optical signal outputs can be calculated based on the peak power output as the output of the peak detector 61 and the average power output as the output of the optical detector 62. This is based on the characteristics that when the peak power is constant, the average power decreases (increases) along the decrease (increase) of the crosspoint, and that when the average power is constant, the peak power increases (decreases) along the decrease (increase) of the crosspoint. Based on these characteristics, by calculating a ratio of the output of the peak detector 61 to the output of the optical detector 62 (i.e., by standardizing based on the peak power output), the reference-value setting unit 14 can output which is proportional to the crosspoint to the bias circuit 15, without depending on the output level of the EA modulator. In addition to the method of calculating an output ratio of the output of the peak detector 61 to the output of the optical detector 62, a reference value which makes the crosspoint constant can be also calculated by using these outputs and a correction coefficient or a correction value for correcting the value of the output.

As explained above, the optical transmitter according to this embodiment sets a bias reference value, based on the output of the peak detector and the output of the optical detector as the average optical power measuring unit. Therefore, a wavelength-independent optical transmitter can be realized, using a simple operation of bias control, and can be further realized without referencing the lookup table or the lookup data. Therefore, a prompt control process can be carried out against a change of the input wave and a variation of the input level.

While the EA modulator is explained as the optical modulator in this embodiment, it is also possible to use an optical modulator other than the EA modulator such as an LN modulator using lithium niobate ($LiNbO_3$), and a Mach-Zehnder modulator using a semiconductor. When these optical modulators are used, a process similar to the above process can be also applied.

Second Embodiment

Figure 8:
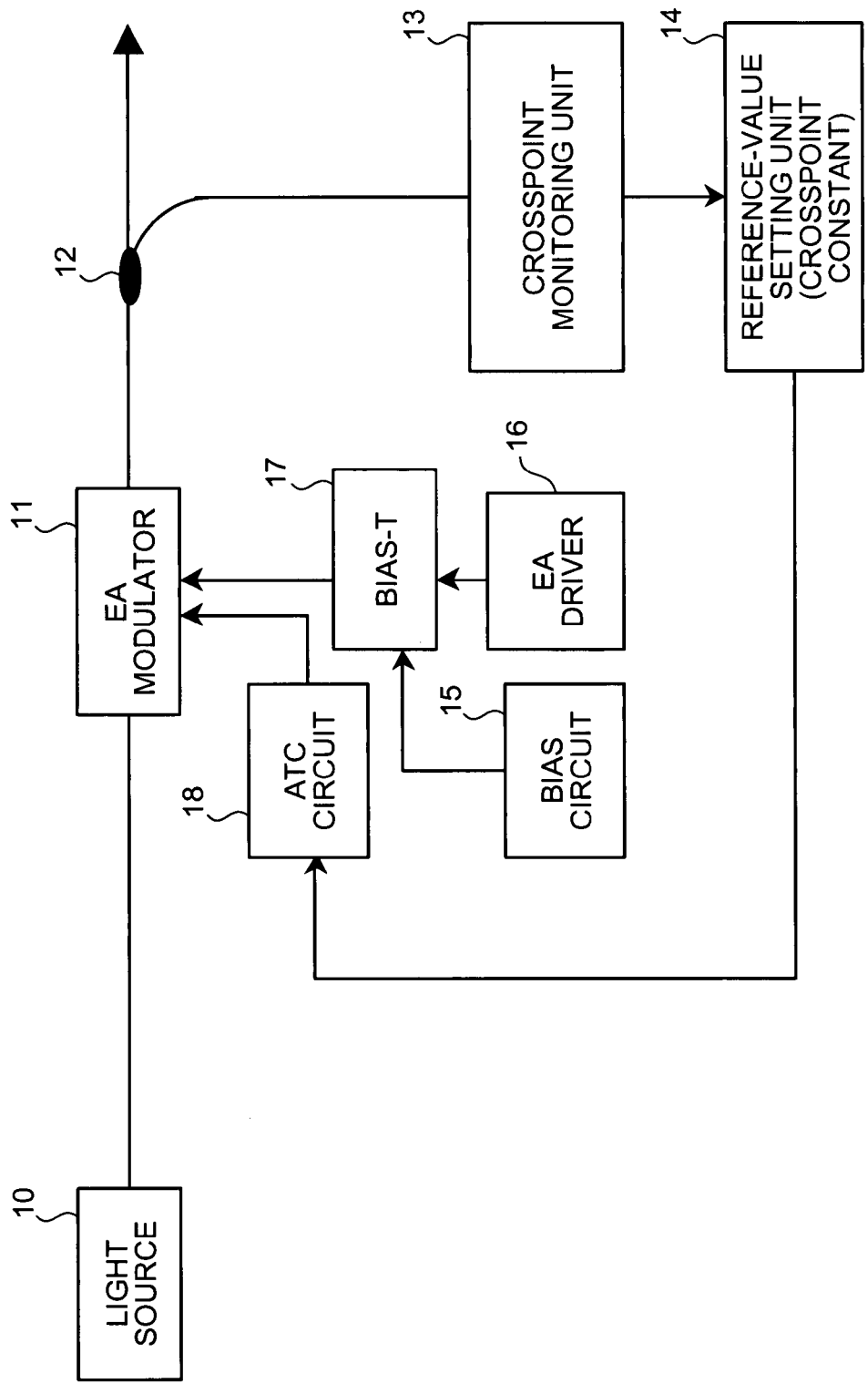
FIG. 8 is a block diagram of a configuration of an optical transmitter according to a second embodiment of the present invention.

An optical transmitter according to a second embodiment of the present invention is explained next. FIG. 8 is a block diagram of a configuration of the optical transmitter according to the second embodiment of the present invention. The optical transmitter shown in FIG. 8 is different from the optical transmitter according to the first embodiment in that a set value of the reference-value setting unit 14 is output to the ATC circuit 18. Otherwise, the optical transmitter of the second embodiment is basically similar to that of the first embodiment, and like reference numerals refer to corresponding parts in both of the embodiments.

Temperature characteristics of the EA modulator are explained with reference to FIG. 2. When temperature of the element of the EA modulator is changed, in FIG. 2, an extinction curve shifts toward the left lower side when the temperature increases, and shifts toward the right upper side when the temperature decreases. In other words, when the temperature becomes higher, the extinction ratio becomes larger and the loss becomes larger. When the temperature becomes lower, the extinction ratio becomes smaller and the loss becomes smaller. This phenomenon is attributable to a fact that a semiconductor bandgap becomes larger (smaller) when the temperature becomes lower (higher).

Therefore, in place of the configuration that controls the bias voltage Vb to make the crosspoint constant in the first embodiment, a set value of the reference-value setting unit 14 is calculated to make the crosspoint constant, and the calculated set value is output to the ATC circuit 18. The ATC circuit 18 controls the element temperature of the EA modulator, thereby controlling the wavelength-independent EA modulator.

The set value output from the reference-value setting unit 14 to the ATC circuit can be calculated based on the output of the peak detector 61 and the output of the optical detector 62, like in the first embodiment.

As explained above, the optical transmitter according to this embodiment sets the temperature set reference value, based on the output of the peak detector and the output of the optical detector as the average optical power measuring unit. Therefore, a wavelength-independent optical transmitter can be realized by a simple operation of temperature control, and can be further realized without referencing the lookup table or the lookup data. Accordingly, a prompt control process can be carried out against a change of the input wave and a variation of the input level.

While the optical transmitter according to this embodiment outputs the output of the reference-value setting unit 14 to the ATC circuit 18, in addition to this output, the output of the reference-value setting unit 14 can be also output to the bias circuit 15, like in the first embodiment. In this case, while the scale of the apparatus becomes larger than that of the apparatuses in the first and second embodiments, further detailed control can be achieved, thereby increasing the level of wavelength independency.

While the EA modulator is also used for the optical modulator in this embodiment, other optical modulator than the EA modulator can be also used like in the first embodiment.

Third Embodiment

Figure 9:
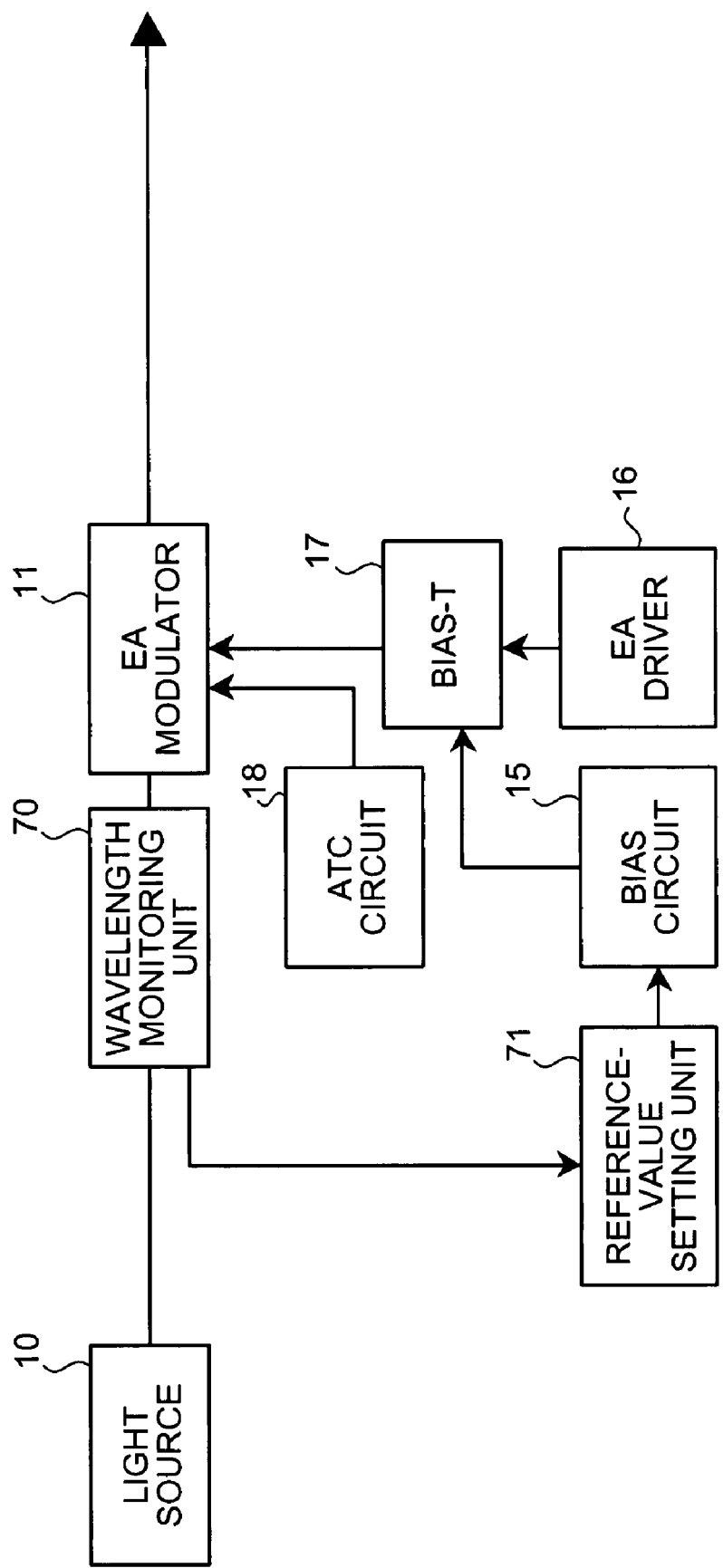
FIG. 9 is a block diagram of a configuration of an optical transmitter according to a third embodiment of the present invention.

An optical transmitter according to a third embodiment of the present invention is explained next. FIG. 9 is a block diagram of a configuration of the optical transmitter according to the third embodiment of the present invention. The optical transmitter shown in FIG. 9 includes a wavelength monitoring unit 70 that monitors wavelength of an optical signal input to the EA modulator 11, and a reference-value setting unit 71 that sets a predetermined reference value assigned to the bias circuit 15 based on output of the wavelength monitoring unit 70, in place of the configuration of monitoring part of the output light from the EA modulator according to the first embodiment. Otherwise, the optical transmitter of the third embodiment is basically similar to that of the first embodiment, and like reference numerals refer to corresponding parts in both of the embodiments.

The operation of the optical transmitter according to this embodiment is explained with reference to FIG. 9. Explanations of the operation of parts identical with or equivalent to those of the optical transmitter according to the first embodiment are omitted.

In FIG. 9, the wavelength monitoring unit 70 monitors wavelength information of the optical signal that enters the EA modulator 11, and outputs the monitored wavelength information to the reference-value setting unit 71. The reference-value setting unit 71 outputs an optimum set value from the preset reference value to the bias circuit 15, based on the input wavelength information. The bias circuit 15 applies a predetermined bias to the EA modulator 11 via the bias-T 17, based on the set value output from the reference-value setting unit 71. As a result of carrying but these processes, the EA modulator 11 outputs an optical modulation signal stabilized against the change of the input wavelength and the changed of the input level.

In the above explanation, the "preset reference value" means a reference value stored by hardware or by software as an optimum bias voltage for each wavelength, based on the element characteristic as shown in FIG. 3, for example. The method of using the preset reference value is a more direct method than the method according to the first embodiment, and is particularly effective when optical signal wavelengths to be used are set in advance or when the number of optical signal wavelengths used is limited.

When a used optical signal wavelength continuously changes, the wavelength does not need to be continuously identified, and the wavelength information monitored by the wavelength monitoring unit 70 can be identified by discrete blocks (for example, a short wave, a medium wave, and a long wave).

As explained above, the optical transmitter according to this embodiment determines a wavelength of an optical signal that enters the optical amplifier based on an output signal from the optical detector as an optical power monitoring unit and an output signal from an excitation-current monitoring unit. Therefore, a wavelength-independent optical transmitter can be realized with a simple configuration. Because the wavelength detection function is provided at the input stage of the EA modulator, the optical transmitter can be configured to obtain the wavelength information from the outside, which further simplifies the configuration of the optical transmitter.

While the wavelength monitoring unit 70 according to this embodiment is installed at the input stage of the EA modulator 11 to monitor the optical wavelength, the wavelength monitoring unit 70 can be installed at the output stage of the EA modulator 11 to monitor the optical wavelength. Light split by the optical coupler can be monitored at both the input stage and the output stage. Because it is sufficient to understand the optical wavelength input to the EA modulator 11, the wavelength information can be obtained from the outside of the optical transmitter according to the present invention, regardless of the installation position of the wavelength monitoring unit 70.

In this embodiment, an optical modulator other than the EA modulator can be also used, like in the first and second embodiments. In this case, a reference value (bias reference value) suitable for the used optical modulator can be held in the reference-value setting unit in advance.

Fourth Embodiment

Figure 10:
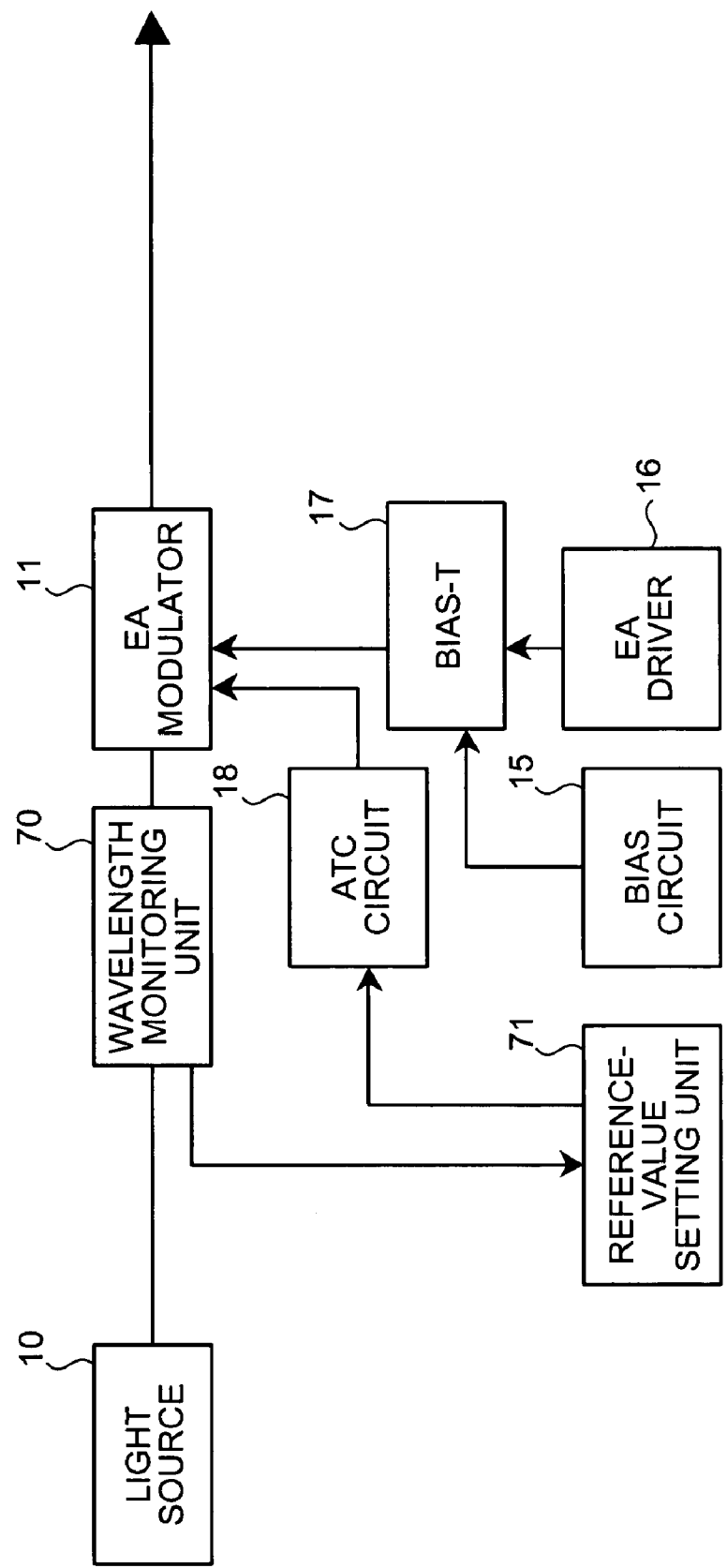
FIG. 10 is a block diagram of a configuration of an optical transmitter according to a fourth embodiment of the present invention.

An optical transmitter according to a fourth embodiment of the present invention is explained with reference to FIGS. 10 to 14. FIG. 10 is a block diagram of a configuration of the optical transmitter according to the fourth embodiment of the present invention. The optical transmitter shown in FIG. 10 is different from that of the third embodiment in that a set value of the reference-value setting unit 14 is output to the ATC circuit 18. Otherwise, the optical transmitter of the fourth embodiment is basically similar to that of the third embodiment, and like reference numerals refer to corresponding parts in both of the embodiments.

Figure 11:
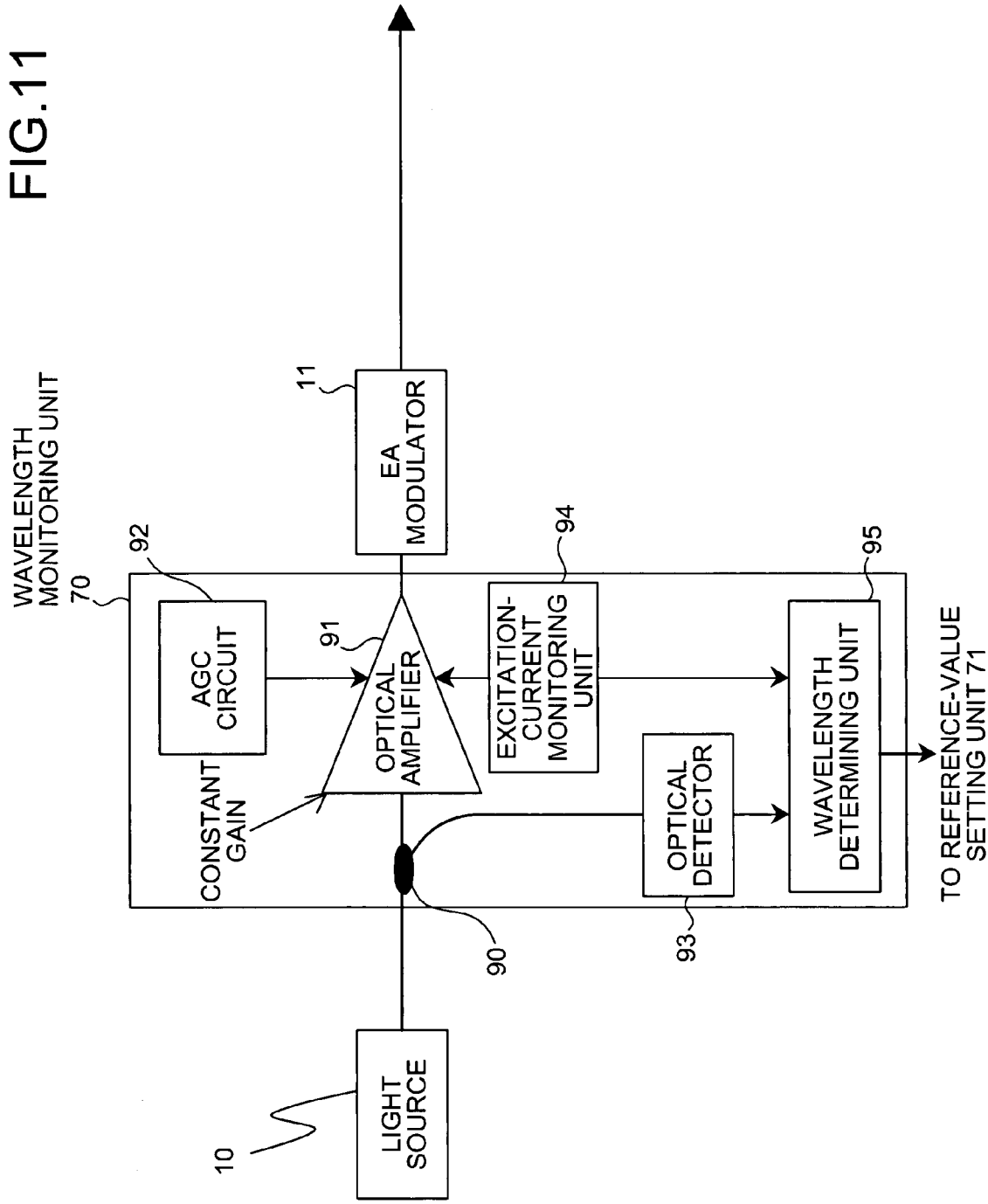
FIG. 11 is one example of a wavelength monitoring unit.

FIG. 11 is one example of the wavelength monitoring unit 70. The wavelength monitoring unit 70 shown in FIG. 11 includes: an optical coupler 90 that splits an input signal; an optical amplifier 91 that pre-amplifies one of the split signals (main signal); an AGC circuit 92 that controls gain of the optical amplifier 91 at a constant level; an optical detector 93 that receives an optical signal obtained by splitting the optical signal by the optical coupler 90, and monitors input power to the wavelength monitoring unit 70; an excitation-current monitoring unit 94 that monitors excitation current of the optical amplifier 91; and a wavelength determining unit 95 that determines an optical signal wavelength, based on the output signals of the optical detector 93 and the excitation-current monitoring unit 94.

Figure 12:
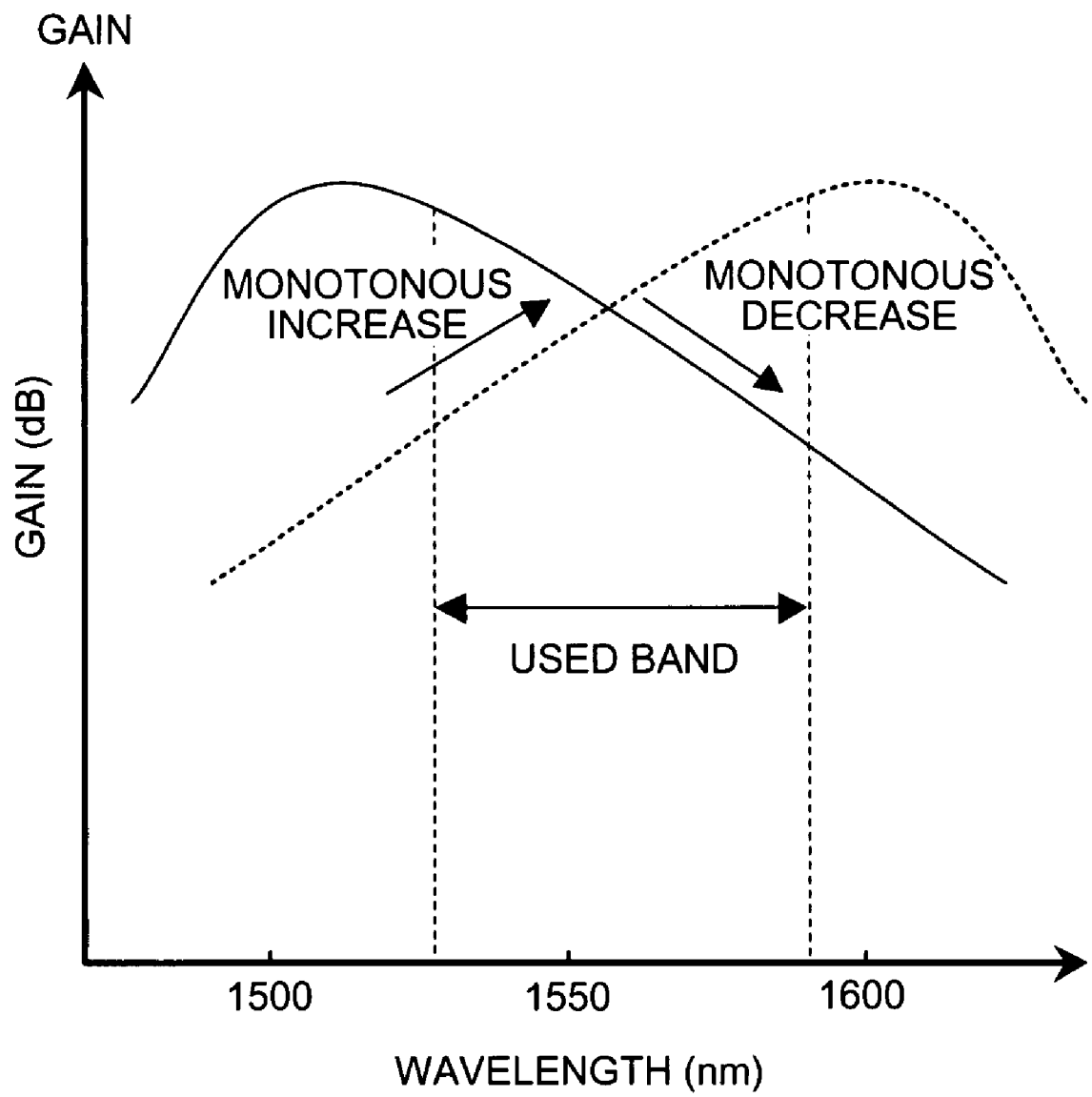
FIG. 12 is one example of gain profile of an optical amplifier during constant excitation-current operation.

FIG. 12 is one example of gain profile of the optical amplifier 91 during constant excitation-current operation. The optical amplifier having a gain characteristic as shown in FIG. 12 can determine a wavelength of an input optical signal, by using gain profile (solid line part) indicating a monotonous decrease of gain, or gain profile (broken line part) indicating a monotonous increase of gain, relative to a change of a wavelength within the used waveband, respectively.

Figure 13:
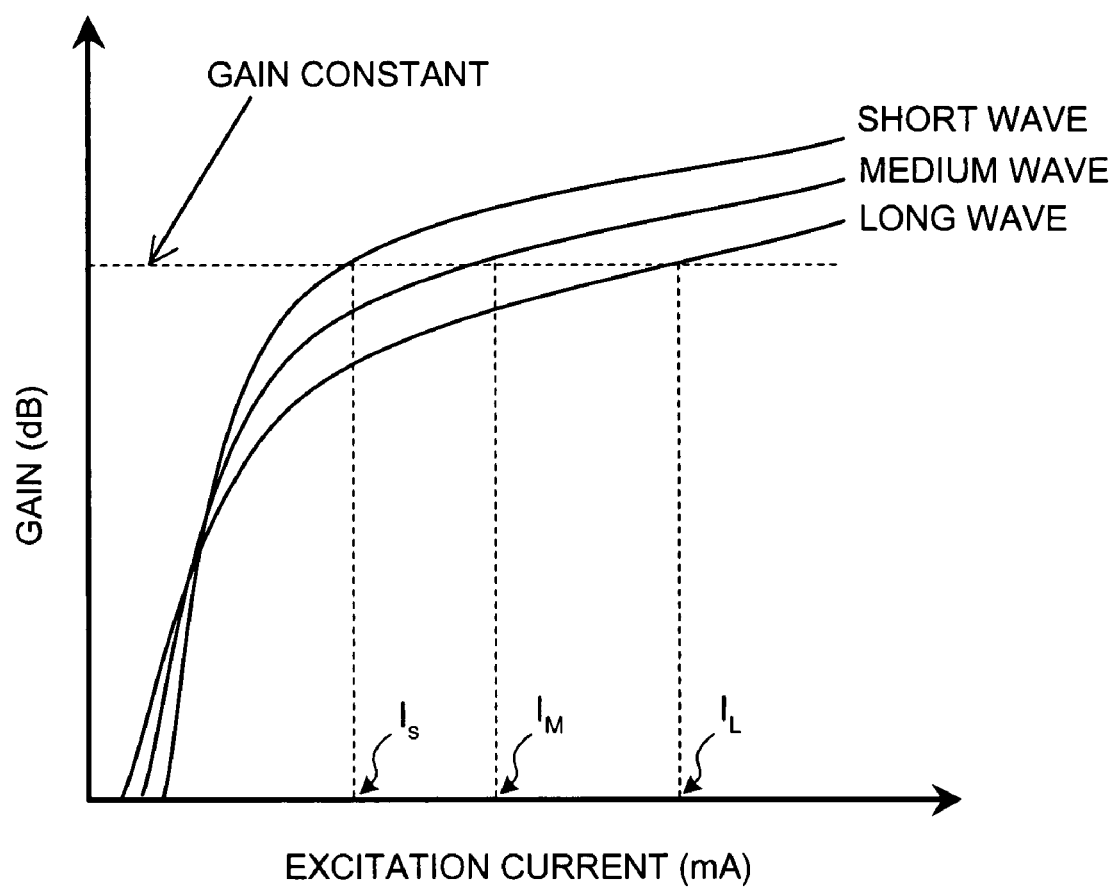
FIG. 13 is a chart that depicts a relationship between excitation currents and gain for each wavelength when input optical power is constant in the optical amplifier having the gain profile as shown in FIG. 12.

FIG. 13 is a chart that depicts a relationship between excitation currents and gain for each wavelength when the input optical power is constant in the optical amplifier having the gain profiles as shown in FIG. 12. When the gain of the optical amplifier 91 is controlled to be constant by the AGC circuit 92, excitation currents ($I_S$, $I_M$, $I_L$) that are necessary for each wavelengths are different, as shown in FIG. 13. Therefore, when the excitation-current monitoring unit 94 monitors the excitation currents during the gain-constant period, and outputs the monitored result to the wavelength determining unit 95, a wavelength of the input optical signal can be determined. In this case, the wavelength determining unit 95 can hold excitation current necessary for each wavelength of each input level in a lookup table, or can store the excitation current by hardware. The wavelength determining unit 95 that stores this information can determine a wavelength (input optical signal wavelength) corresponding to the output, based on the monitor output (excitation current) output from the excitation-current monitoring unit 94 and the input level output from the optical detector 93.

Figure 14:
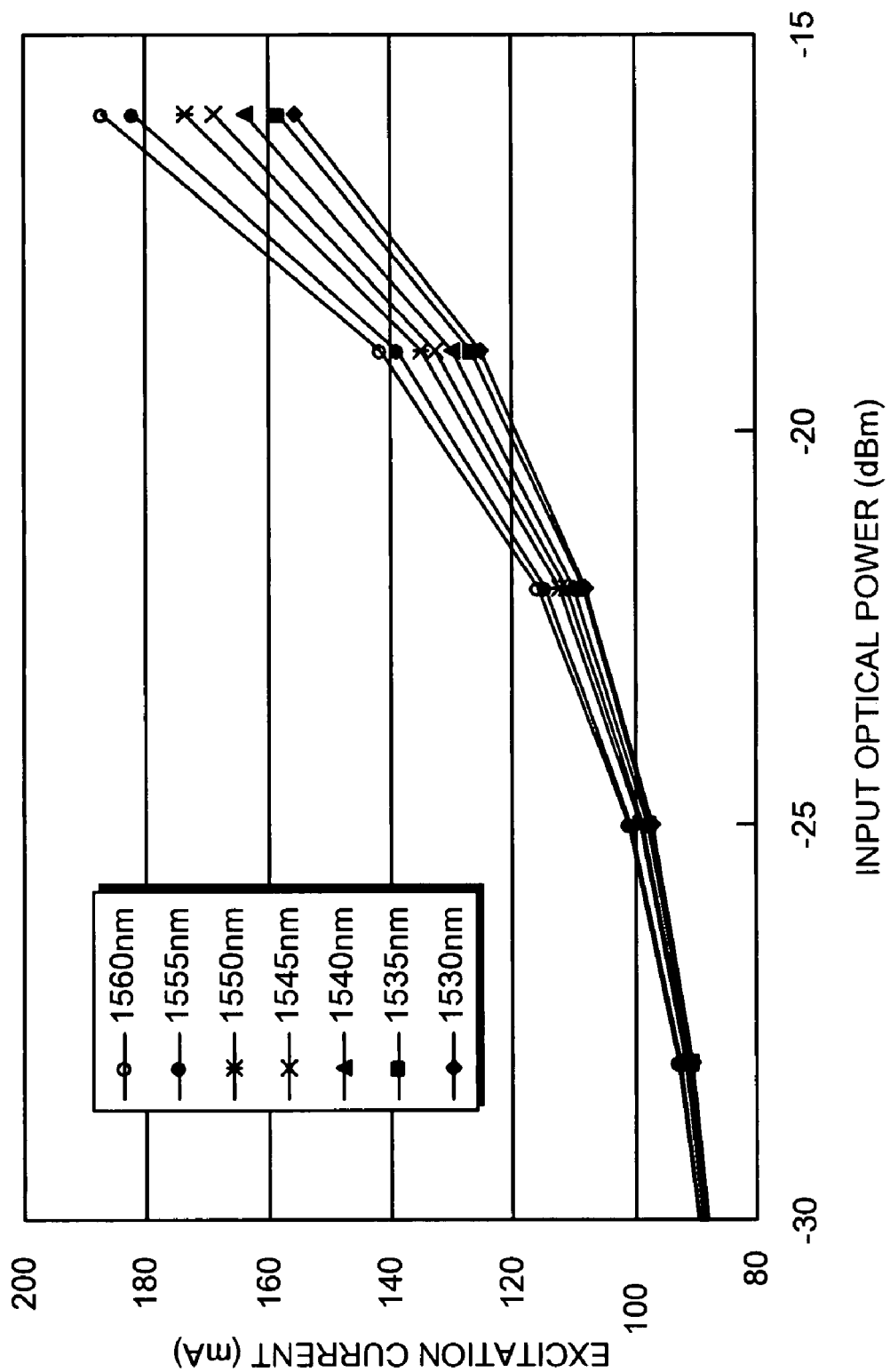
FIG. 14 is one example of measurement results of a relationship between input optical power and excitation current in a semiconductor optical amplifier (SOA).

As an optical amplifier having characteristics as shown in FIGS. 12 and 13, a semiconductor optical amplifier (SOA) is available, and has characteristics as shown in FIG. 14. As is clear from the characteristic shown in FIG. 14, a wavelength of an input optical signal can be uniquely specified in an accuracy of about 5 nanometers.

As explained above, the optical transmitter according to this embodiment determines a wavelength of an optical signal that enters the optical amplifier based on an output signal from an optical detector as an optical power monitoring unit and an output signal from the excitation-current monitoring unit. Therefore, a wavelength-independent optical transmitter can be realized with a simple configuration. Because the wavelength detection function is provided at the input stage of the EA modulator, the optical transmitter can be configured to obtain the wavelength information from the outside, which further simplifies the configuration of the optical transmitter.

While the SOA is explained above as one example of the amplifier that has the characteristics as shown in FIGS. 12 to 14, the amplifier is not limited to the SOA, and can be an amplifier having a characteristic capable of uniquely identifying the used wavelength in the optical wave band used.

In this embodiment, a modulator other than the EA modulator can be also used, like in the first to third embodiments.

In this embodiment, while the configuration of the wavelength monitoring unit 70 shown in FIG. 11 is applied to the transmitter of the fourth embodiment shown in FIG. 10, this configuration can be also applied to the optical transmitter of the third embodiment shown in FIG. 9.

Fifth Embodiment

Figure 15:
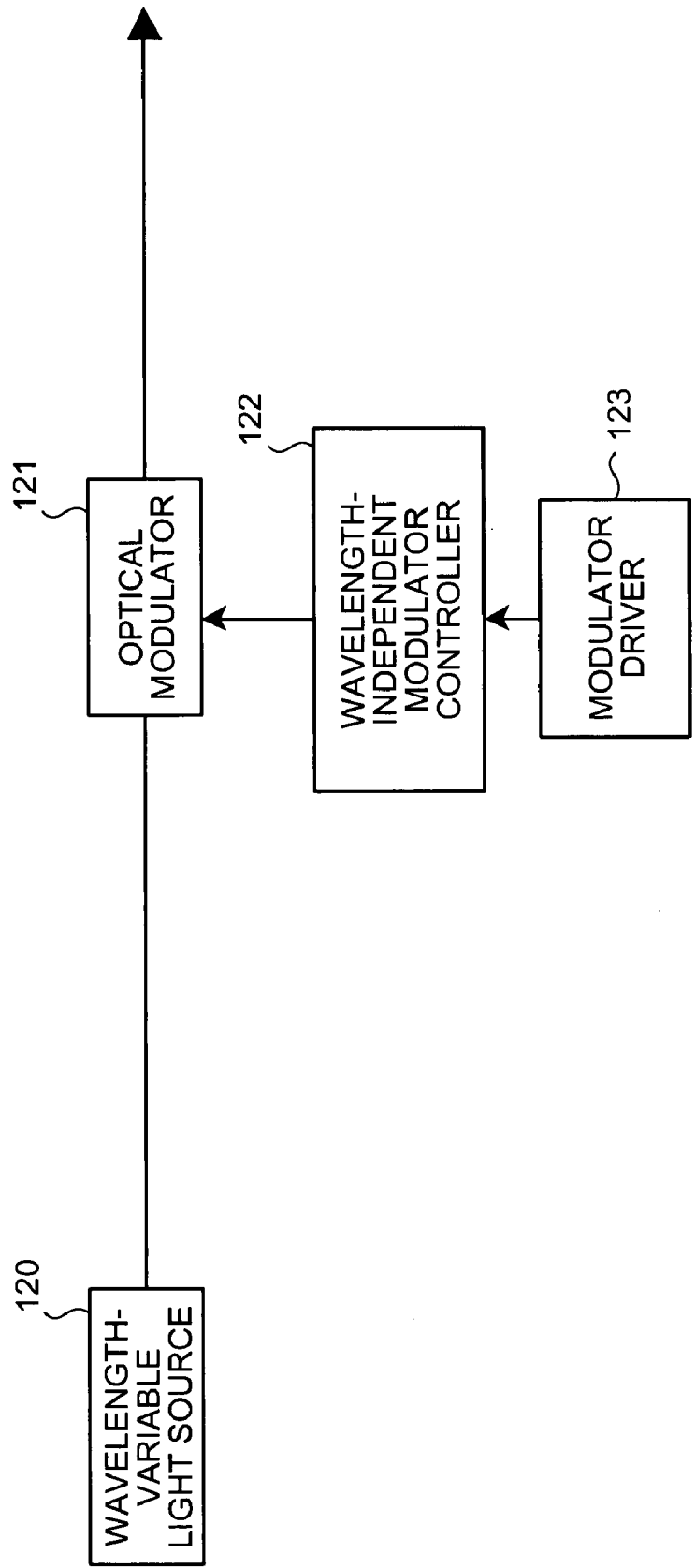
FIG. 15 is a block diagram of a configuration of an optical transmitter (wavelength-independent optical transmitter) according to a fifth embodiment of the present invention.

An optical transmitter according to a fifth embodiment of the present invention is explained next with reference to FIG. 15. FIG. 15 is a block diagram of a configuration of the optical transmitter (wavelength-independent optical transmitter) according to the fifth embodiment of the present invention. The optical transmitter shown in FIG. 15 includes: a wavelength-variable light source 120; an optical modulator 121; a wavelength-independent modulator controller 122; and a modulator driver 123. The wavelength-variable light source 120 is not necessarily required to be present in the wavelength-independent optical transmitter.

Functions of the wavelength-independent modulator controller 122 correspond to the optical coupler 12, the cross-point monitoring unit 13, the reference-value setting unit 14, the bias circuit 15 (or the ATC circuit 18), and the bias-T 17, respectively of the optical transmitters shown in FIGS. 1 and 8. Functions of the wavelength-independent modulator controller 122 correspond to the optical coupler 12, the wavelength monitoring unit 70, the reference-value setting unit 71, the bias circuit 15 (or the ATC circuit 18), and the bias-T 17, respectively of the optical transmitters shown in FIGS. 9 and 10. These constituent elements have the function of making the optical transmitter independent of a wavelength as described above. Therefore, a wavelength-independent optical transmitter can be realized, by outputting the output of the modulator driver 123 to the optical modulator 121 via the wavelength-independent modulator controller 122.

The EA modulator explained above can be used for the optical modulator 121. In addition to the EA modulator, the LN modulator and the Mach-Zehnder modulator can be also used.

As explained above, according to the optical transmitter of this embodiment, the optical communication system can be configured by using the wavelength-independent optical transmitters shown in the first to fourth embodiments. The wavelength-independent optical communication system can be realized with a simple configuration.

Sixth Embodiment

Figure 16:
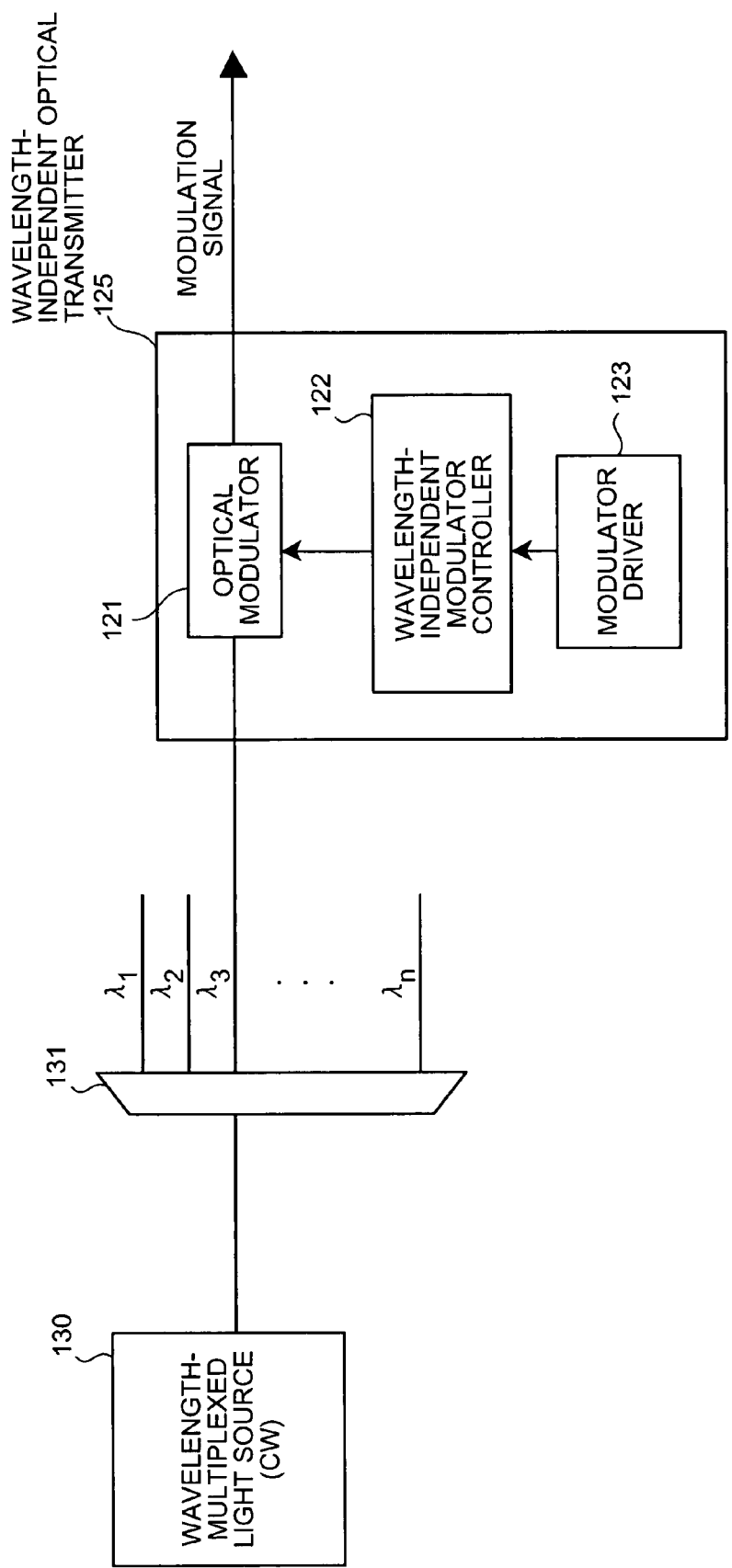
FIG. 16 is a block diagram of a configuration of an optical communication system according to a sixth embodiment of the present invention.

An optical communication system according to a sixth embodiment of the present invention is explained with reference to FIG. 16. FIG. 16 is a block diagram of a configuration of the optical communication system according to the sixth embodiment of the present invention. The optical communication system shown in FIG. 16 indicates an optical communication system applied with the optical transmitter (wavelength-independent optical transmitter) according to the fifth embodiment shown in FIG. 15, and has a wavelength-independent optical transmitter 125, including: a wavelength-multiplexing light source 130; a wavelength demultiplexer 131; the optical modulator 121; the wavelength-independent modulator controller 122; and the modulator driver 123.

According to the optical communication system of this embodiment, one of the wavelengths demultiplexed by the wavelength demultiplexer 131 out of the wavelength-multiplexed lights output from the wavelength-multiplexing light source 130 is input to the wavelength-independent optical transmitter 125. The wavelength-independent optical transmitter 125 outputs a modulation signal having an optimum modulated wavelength.

An arrayed-waveguide grating (AWG) demultiplexer can be used for the wavelength demultiplexer 131. A thin-film filter can be also used in addition to the AWG demultiplexer.

As explained above, according to this embodiment, the wavelength-independent optical transmitters explained in the first to fourth embodiments are applied to the wavelength-multiplexed system. Therefore, a wavelength-independent optical communication system (wavelength-multiplexed optical communication system) can be realized with a simple configuration.

Seventh Embodiment

Figure 17:
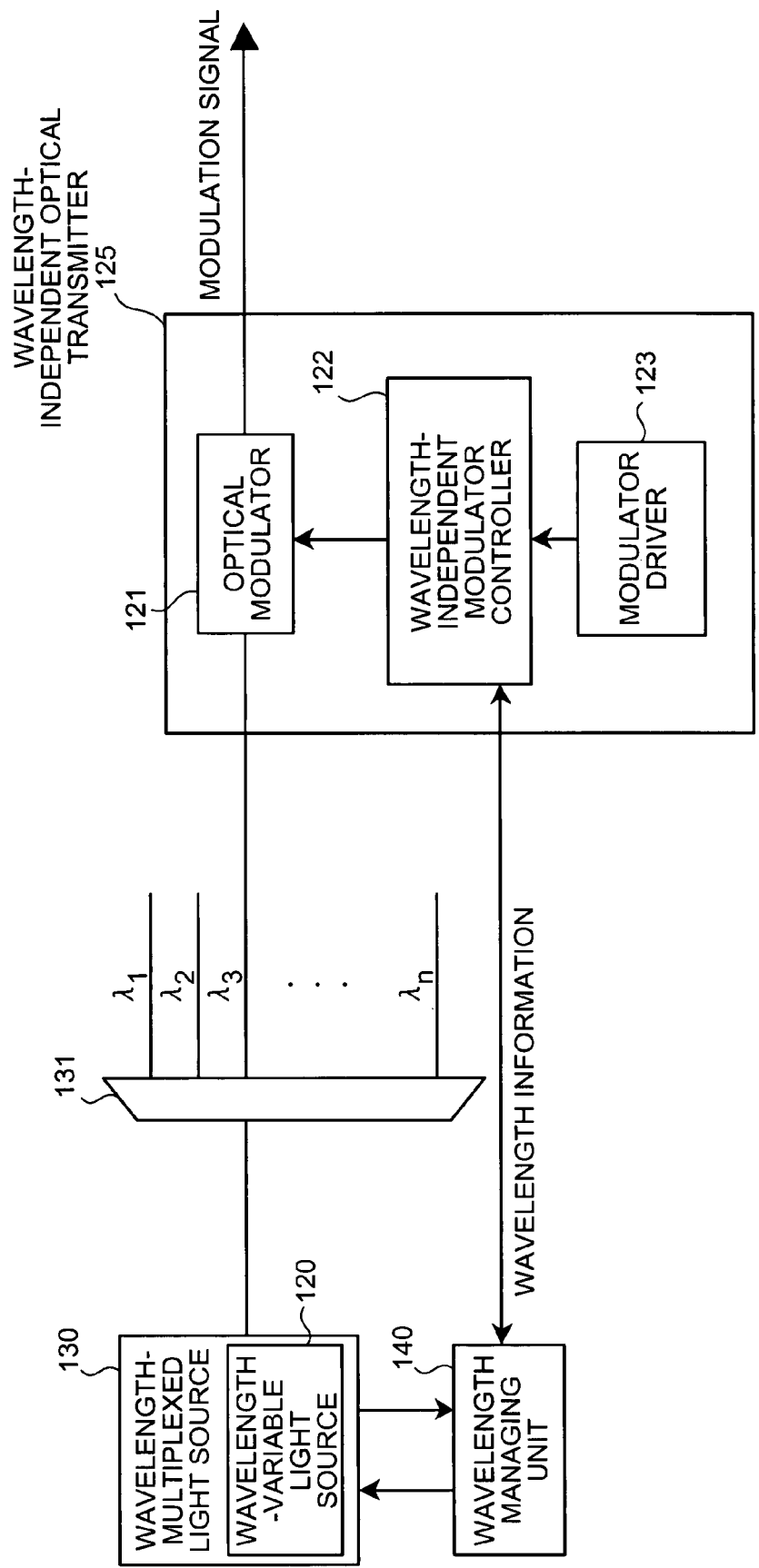
FIG. 17 is a block diagram of a configuration of an optical communication system according to a seventh embodiment of the present invention.

An optical communication system according to a seventh embodiment of the present invention is explained with reference to FIG. 17. FIG. 17 is a block diagram of a configuration of the optical communication system according to the seventh embodiment of the present invention. The optical communication system shown in FIG. 17 is different from that of the sixth embodiment in that the optical communication system includes the wavelength-multiplexing light source 130 including the wavelength-variable light source 120 and a wavelength managing unit 140 having a function of transmitting and receiving wavelength information to and from the wavelength-independent optical transmitter 125. Otherwise, the optical communication system of the seventh embodiment is basically similar to that of the sixth embodiment, and like reference numerals refer to corresponding parts in both of the embodiments.

According to the optical communication system of this embodiment, the wavelength managing unit 140 recognizes the wavelength information switched by the wavelength-multiplexing light source 130, and transmits the recognized wavelength information to the wavelength-independent optical transmitter 125. Therefore, the optical communication system according to this embodiment can carry out a flexible service such as a switching of a transmission path without being conscious of a wavelength. Because the optical transmitter directly obtains the wavelength information from the outside, the input optical signal wavelength does not need to be monitored. Further, the optical transmitter can be made compact, and the processing time of the optical transmitter can be shortened.

As explained above, according to the optical transmitter of this embodiment, the wavelength-independent optical transmitters explained in the first to fourth embodiments can be applied to the wavelength-multiplexed system, and the wavelength-multiplexing light source outputs the wavelength information to the optical transmitter. Therefore, the optical transmitter can be made compact, and the processing time of the optical transmitter can be shortened.

INDUSTRIAL APPLICABILITY

As explained above, the optical transmitter and the optical communication system according to the present invention are useful as the wavelength-independent optical transmitter and the wavelength-independent optical communication system.

The invention claimed is:

1. An optical transmitter comprising:
   an optical modulator;
   a wavelength monitoring unit that monitors a wavelength of an optical signal that enters the optical modulator;
   a reference-value setting unit that sets a bias reference value to be assigned to the optical modulator based on an output of the wavelength monitoring unit; and
   a bias circuit that applies a bias to the optical modulator based on the bias reference value.

2. The optical transmitter according to claim 1, wherein the wavelength monitoring unit includes
   an optical amplifier that has variable gain, the gain monotonously decreasing or monotonously increasing according to a change in wavelength;
   an optical coupler that splits the optical signal that enters the optical amplifier into a plurality of optical signals;
   an optical power monitoring unit that receives part of the optical signals, and monitors optical power input to the optical amplifier;
   an excitation-current monitoring unit that monitors excitation current of the optical amplifier;
   an automatic gain control circuit that controls the gain of the optical amplifier to be constant; and
   a wavelength determining unit that determines a wavelength of the optical signal that enters the optical amplifier based on an output of the optical power monitoring unit and an output of the excitation-current monitoring unit.

3. The optical transmitter according to claim 2, wherein the optical amplifier is a semiconductor optical amplifier.

4. An optical transmitter comprising:
   an optical modulator;
   a wavelength monitoring unit that monitors a wavelength of an optical signal that enters the optical modulator;
   a reference-value setting unit that sets a temperature-setting reference value to be assigned to the optical modulator based on an output of the wavelength monitoring unit; and
   an automatic temperature control circuit that controls temperature of the optical modulator based on the temperature-setting reference value, wherein
   the wavelength monitoring unit includes
   an optical amplifier that has variable gain, the gain monotonously decreasing or monotonously increasing according to a change in wavelength;
   an optical coupler that splits the optical signal that enters the optical amplifier into a plurality of optical signals;
   an optical power monitoring unit that receives part of the optical signals, and monitors optical power input to the optical amplifier;
   an excitation-current monitoring unit that monitors excitation current of the optical amplifier;
   an automatic gain control circuit that controls the gain of the optical amplifier to be constant; and
   a wavelength determining unit that determines a wavelength of the optical signal that enters the optical amplifier based on an output of the optical power monitoring unit and an output of the excitation-current monitoring unit.

* * * * *